United States Patent
Zhang et al.

(10) Patent No.: US 11,971,486 B2
(45) Date of Patent: Apr. 30, 2024

(54) METHOD FOR GENERATING THREE-DIMENSIONAL IMAGES WITH SUPERCONDUCTING NANOWIRE PHOTON DETECTION ARRAY

(71) Applicant: NANJING UNIVERSITY, Nanjing (CN)

(72) Inventors: Labao Zhang, Nanjing (CN); Rui Yin, Nanjing (CN); Biao Zhang, Nanjing (CN); Shuya Guo, Nanjing (CN); Jingrou Tan, Nanjing (CN); Rui Ge, Nanjing (CN); Lin Kang, Nanjing (CN); Peiheng Wu, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 17/984,359

(22) Filed: Nov. 10, 2022

(65) Prior Publication Data
US 2023/0079154 A1    Mar. 16, 2023

Related U.S. Application Data

(63) Continuation-in-part of application No. 17/234,538, filed on Apr. 19, 2021, now abandoned.

(30) Foreign Application Priority Data

Jun. 28, 2020   (CN) .......................... 202010595694.3

(51) Int. Cl.
*G01S 17/894*   (2020.01)
*G01S 7/481*    (2006.01)
(Continued)

(52) U.S. Cl.
CPC .......... *G01S 17/894* (2020.01); *G01S 7/4816* (2013.01); *G01S 7/4863* (2013.01); *G01S 7/4865* (2013.01); *H04N 25/772* (2023.01)

(58) Field of Classification Search
CPC .. G01J 1/44; G01S 17/02; G01S 17/10; G01S 17/89; G01S 17/88; G01S 7/48;
(Continued)

(56) References Cited

U.S. PATENT DOCUMENTS

| | | | |
|---|---|---|---|
| 9,915,733 B2 * | 3/2018 | Fried | G01S 17/42 |
| 10,665,634 B2 * | 5/2020 | Zhao | H10N 69/00 |
| 2015/0362688 A1 * | 12/2015 | Pernice | B82Y 20/00 |
| | | | 438/69 |

* cited by examiner

*Primary Examiner* — Seung C Sohn
(74) *Attorney, Agent, or Firm* — CBM PATENT CONSULTING, LLC

(57) ABSTRACT

A superconducting nanowire photon detection array adjusts a number of the array elements, a lens array that 1) splits transmitted lights into multiple beams that equals the number of the array elements, and are converged in to a superconducting nanowire detection area; 2) a pulsed laser detects a surface of an object, transmits reflected different light pulses by the surface of the object through the lens array, and records a round-trip time of each photon; 3) collects the photons detected by each array element, takes the array elements as pixels and calculates a gray value of the pixels; and 4) plots a gray-scale image by taking the pixels as pixel points, calculates a distance between the object and the pixel points, and reconstructs a three-dimensional image of the object.

9 Claims, 6 Drawing Sheets

(51) Int. Cl.
*G01S 7/4863* (2020.01)
*G01S 7/4865* (2020.01)
*H04N 25/772* (2023.01)

(58) Field of Classification Search
CPC .... G01S 7/4816; G01S 7/4863; G01S 7/4865; G01S 17/894; H04N 25/772; H04N 25/705
USPC ........................ 250/214 R, 214.1, 208.1, 221
See application file for complete search history.

METHOD FOR GENERATING THREE-DIMENSIONAL IMAGES WITH SUPERCONDUCTING NANOWIRE PHOTON DETECTION ARRAY

CROSS REFERENCES

This application is a continuation in part of U.S. application Ser. No. 17/234,538 filed 19 Apr. 2021 that claims priority to Chinese Patent Application Ser. No. 202010595694.3 filed 28 Jun. 2020.

TECHNICAL FIELD

The present invention belongs to the technical field of superconducting nanowire photon detection, and particularly relates to an array imaging technology.

BACKGROUND

A superconducting nanowire single photon detector (SNSPD), a novel single photon detector, is applied to the fields of quantum information, space communication, laser radar, spectrum detection, time flight, depth imaging and the like, has the advantages of high sensitivity, low noise, low dark counting, low time jitter and the like.

A SNSPD is prepared from an ultrathin superconducting material, forms a local hot-spot by absorbing photons, and generates voltage pulse signals at two ends of the SNSPD to realize single photon detection. A bias current $I_b$ is applied to the SNSPD in the superconducting state, and a "hot-spot" is locally formed after the nanowire absorbs photons; the density of the current around the "hot-spot" exceeds superconducting critical current density, the partial resistance is increased, so that the current of the SNSPD is reduced, and meanwhile, the joule heat effect of a resistance area is weakened to dissipate heat to surrounding environment; the temperature of the resistance area is gradually reduced to the ambient temperature, the resistance area disappears, and the current of the SNSPD is recovered to the initial state.

The formation of electrical pulses reflects the process that the current of the SNSPD $I_D$ changes along with time, and if an external bias current $I_b$ is constant, the SNSPD is equivalent to a dynamic inductor $L_k$, a switch S and a time-varying resistor Rn. When the SNSPD does not generate photon responses, the SNSPD is in a superconducting state, S is closed, current passes through the SNSPD to ground, $I_L=0$, and $I_D=I_B$; after the nanowire absorbs photons, S is opened to form the resistor Rn, and according to the current continuity theorem, $I_L+I_D=I_B$, $I_D$ is rapidly reduced, and $I_L$ is rapidly increased; due to the existence of an electrothermal feedback mechanism in the SNSPD, the SNSPD is recovered to a superconducting state after tens of nanoseconds, and S is closed.

The detection efficiency of a single SNSPD is higher than that of a semiconductor avalanche photodiode (APD), but the single SNSPD can only represent whether photons are absorbed or not and cannot accurately output a number and spatial position distribution of the photons. By encoding the spatial position of the photons, the information which can be represented by the single photon can be further increased, but a detection area of the SNSPD is increased, and the dynamic inductance of the detector is increased at the same time, which influences the speed of the detector.

The large-scale superconducting nanowire single-photon detector array is used to make the size of a single picture element to be as small as possible, and a large-area single photon detection is achieved through a plurality of pixels; however, at present, it is still difficult to form a large-scale array by a plurality of SNSPDs and read the same.

A conventional imaging system digitizes an analog signal, processes the digital signal, and restores the digital signal into an original image. Two methods for digitizing weak signals are common. In the first method, weak current signals are converted and amplified into voltage signals in real time, that is, I-V conversion is performed, then analog voltage signals are converted into digital signals by A/D conversion, signals outputted by a detector are completely restored, and carriers in a common semiconductor radio frequency amplifier do not migrate and lose amplification effect under a condition of superconducting low temperature. The second method is a time period processing method, a current-voltage real-time conversion or integral circuit is adopted at the front end to convert current into a voltage signal, then the voltage signal is converted into pulses by a circuit such as a V-F conversion or a comparator, a single pulse represents fixed charge quantity, and the total charge quantity is in direct proportion to the number of the pulses.

SUMMARY

The present invention adopts a second method to solve the problems in the prior art, provides a three-dimensional imaging method based on a superconducting nanowire photon detection array, converts outputted pulse signals into current signals, integrates the current signals within a period of time, then converts the current signals into pulse output, inverts a number of pulses according to the direct-proportion relation between the total charge quantity and the number of outputted pulses, has a working wave band of 750 nm to 1550 nm and has the highest photon detection efficiency of 98%. In order to achieve the above purpose, the present invention adopts the following technical solutions.

Superconducting nanowire single-photon detectors (SNSPDs) are used as pixels to form a superconducting nanowire photon detection array; a lens array is used as a photon alignment system to divide the transmitted light into multiple beams with the same number of pixels. The light beam converges to the superconducting nanowire photosensitive surface area. A pulsed laser is used to emit pulsed light to the surface of the object to be measured. Different light pulses reflected from the surface of the object pass through the lens array. The superconducting nanowire single-photon detector detects the return signal and records the time difference between each emitted photon and the received optical signal. Collect the number of photons detected by each pixel, take the pixel as the pixel point, and calculate the gray value of the pixel point according to the number of photons of the pixel. According to the round-trip time of each photon, the distance from the object to the pixel is calculated, and the three-dimensional image of the object is reconstructed according to the grayscale image and the distance between the object and the pixel.

Each detector pixel includes a superconducting nanowire part, an amplifier circuit, a conversion circuit, an integrating circuit and a buffer, wherein the superconducting nanowire circuit is connected to the input end of the amplifier circuit, and the output end of the amplifier circuit is connected to the input end of the integrating circuit Through the conversion circuit, the output end of the integrating circuit is connected with the computer through the buffer.

Superconducting nanowire single photon detectors: photodetectors made of superconducting nanowires, the basic principle of which is that the SNSPDs in the biased state absorb photons and generate a resistive state, which affects the current distribution of the circuit. Through the low-noise amplifier, the optical pulse response generated by the current change is read out.

Superconducting nanowires: SNSPDs made from superconducting materials

SNSPD: Nanoscale Lines

The superconducting nanowire circuit is located at a center of the pixel, and is connected with coplanar superconducting delay lines by connecting the superconducting nanowires and a thin film resistor in parallel; each row of the superconducting delay lines are connected with each other, the thin film resistor has a resistance value of $10\Omega$ to $10000\Omega$, and the resistance generated by superconducting nanowire photon responses is in the order of $k\Omega$ to $M\Omega$; the thin film resistor short-circuits the resistance generated by the SNSPD, and releases temporary resistance generated by internal superconducting disturbance, so that the SNSPD is quickly restored to a superconducting state.

The amplifying circuit comprises a biasing circuit, a first stage amplifying circuit, a second stage amplifying circuit and a compensating circuit, wherein the first-stage amplification circuit adopts differential input, and the second-stage amplification circuit adopts a common-source amplifier; the compensating circuit consists of an MOS transistor and a capacitor, the MOS transistor works in a linear region and provides a constant bias current; and resistance is added into the biasing circuit by a source of the MOS transistor, and each pixel shares a constant current source to generate a stable current.

The converting circuit adopts a comparator and an MOS transistor, an input voltage is connected to a non-inverting input end of the comparator, a reference voltage is connected to an inverting input end of the comparator, an output end of the comparator is connected to a gate of the MOS transistor through a pull-up resistor, a drain of the MOS transistor is used as an output current, and if the input voltage is higher than the reference voltage, the MOS transistor conducts the output current.

The integrating circuit adopts an MOS transistor and a capacitor, and an input current charges the capacitor through the MOS transistor to realize integration; and the circuit is reset to a low potential before integrating, and forced reset by a switch or reset by an MOS transistor is adopted.

The nanowire circuit is biased in a state slightly lower than a superconducting critical current of the SNSPD at the superconducting low temperature; the SNSPD absorbs photons at the superconducting low temperature, the superconducting state of an absorption area is damaged, a "hot-spot" occurs, a resistor is generated and is connected with the thin film resistor in parallel, and the resistance value is changed; the SNSPD is cooled, the "hot-spot" disappears, the SNSPD is restored to the initial state, and the resistance value is changed; the changes of the resistance value of the SNSPD enables the circuit to generate electrical pulse signals, and the electrical pulse signals are amplified by the amplifying circuit through the superconducting delay lines; the voltage signals are converted into current signals by the converting circuit, and charge quantity of the current signals is obtained as the charge quantity of absorbed photons by the integrating circuit; and the charge quantity of absorbed photons is stored in the buffer, inputted into the computer by rows, and compared with charge quantity of single photon to obtain the number of the absorbed photons.

A picture element position of a SNSPD for generating photon responses is set as $x_a$, a time point for absorbing photons as $t_a$, a transmission speed of electrical pulse signals generated by the picture element along the SNSPD as v, time read by the computer are $\tau$ and $\tau'$ after the delay through a peripheral circuit and a register, wherein each row of detector delay lines have an equivalent length of L, thus $\tau=t_a+(L-x_a)/v$ and $\tau'=t_a+x_a/v$, and after photons are absorbed, $x_a=((\tau-\tau')v+L)/2$ and $t_a=((\tau+\tau')-L/v)/2$; and n pixels in each row simultaneously generating the photon responses are set, wherein the reading time is $\tau_1, \tau_2, \ldots, \tau_n$, and positions of the photon responses are calculated and obtained.

The pulsed laser is used to record total round-trip time of each photon $\tau_{all}$, a distance between the actual position of the object and the pixel points is calculated according to $1=c*\tau_{all}/2$, where c is light speed in free space.

The present invention not only has single photon detection function, but also can obtain the photon information reflected or directly emitted by a surface of the object, and restores the original photon resolution information of the object by an algorithm, thereby realizing the identification of a target distance and a three-dimensional image.

DETAILED DESCRIPTION OF EMBODIMENTS

The technical solutions of the present invention are described in detail below with reference to the drawings.

Figure 1:
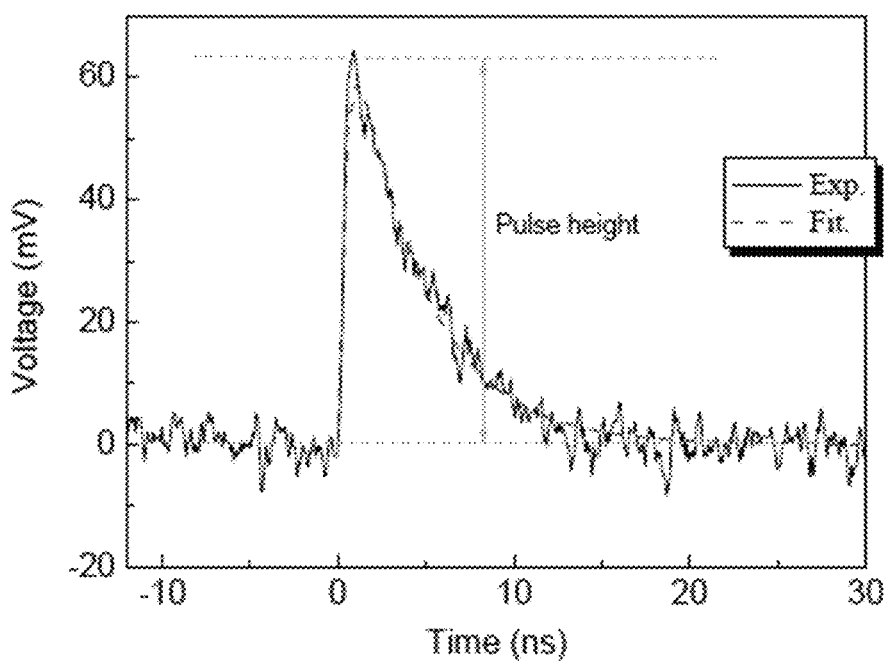
FIG. 1 is voltage pulse signals.

SNSPD adopts a SNSPD prepared from an ultrathin superconducting material, forms a local hot-spot by absorbing photons, and generates voltage pulse signals at two ends of the SNSPD (as shown in FIG. 1) to realize single photon detection.

Figure 2:
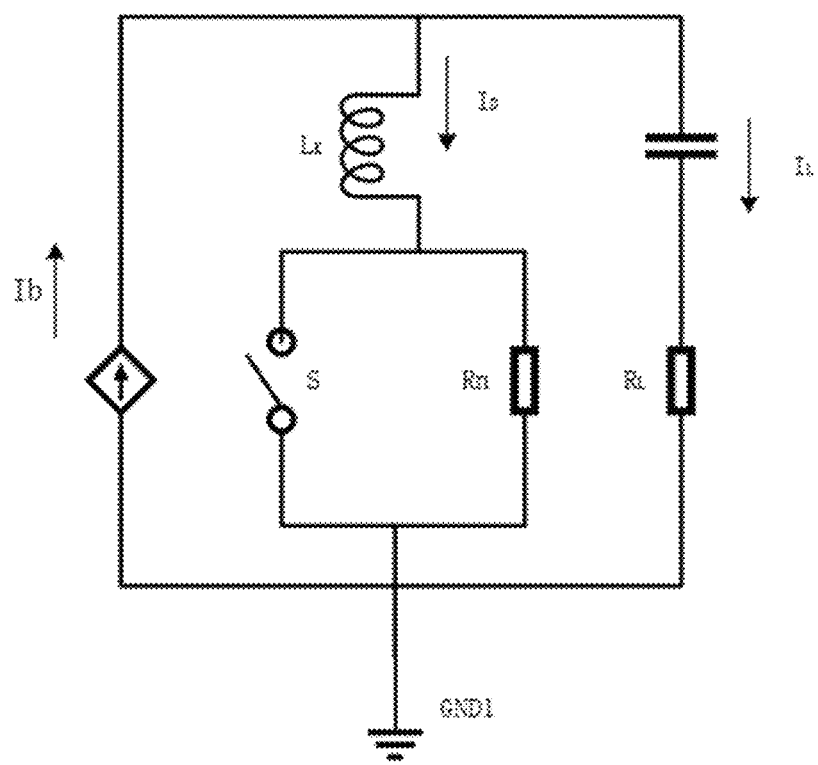
FIG. 2 is an equivalent circuit of an pulse response.

It can be seen from the formation of the electrical pulse that an external bias current $I_b$ is constant, the SNSPD is equivalent to a dynamic inductor $L_k$, a switch S and a time-varying resistor Rn, which is shown in FIG. 2.

When the SNSPD does not generate photon responses, the SNSPD is in a superconducting state as S, when S is closed, current passes through the SNSPD to ground, $I_L=0$, and $I_D=I_B$; after the SNSPD absorbs photons, when S is opened, the resistor Rn is on, and according to the current continuity theorem, $I_L+I_D=I_B$, $I_D$ is rapidly reduced, and $I_L$ is rapidly increased; due to the existence of an electrothermal feedback mechanism in the SNSPD, the SNSPD is recovered to a superconducting state after hundreds of picoseconds, and S is closed.

Superconducting nanowire single photon detectors (SNSPDs) are adopted as pixels to form an array, and incident photons are detected; the pixels are taken as picture elements, voltage pulse signals outputted by each picture element are amplified, and the voltage signals are converted into current signals by adopting an MOS transistor; an integrating capacitor is adopted, the charge quantity is obtained by current signal integration, and a number of photons are calculated according to the charge quantity of the picture elements; the gray scale of each picture element is defined according to the number of photon number of each pixel in the array, the gray scale image of the pixel is generated, and the gray scale image is converted into an original image.

Figure 3:
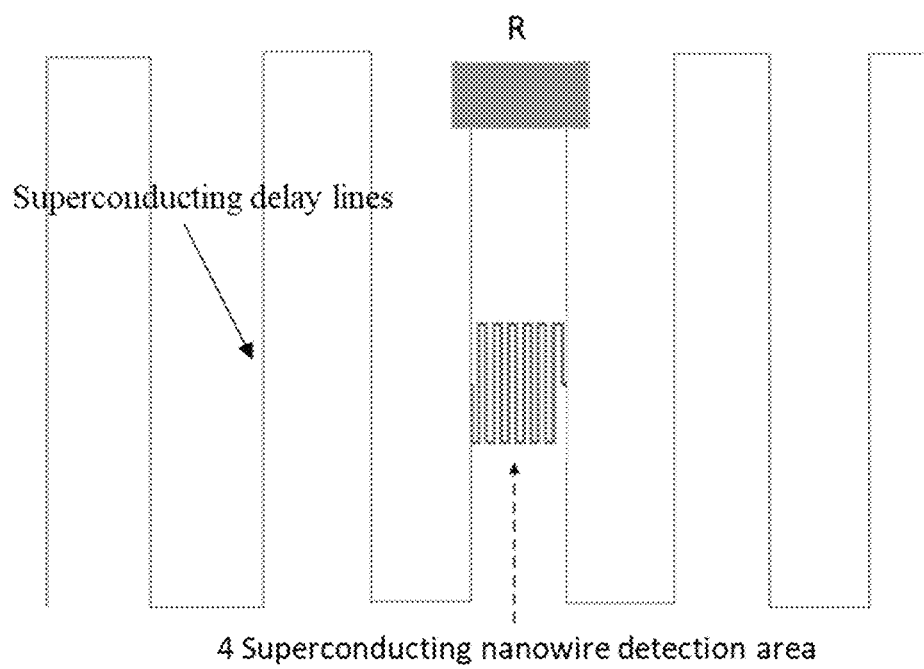
FIG. 3 is a SNSPD and resistor structure.

In the center of a single picture element, a parallel structure formed by a superconducting nanowire and a thin film resistor is adopted, as shown in FIG. 3, two ends of the superconducting SNSPD and the thin film resistor are connected with a coplanar superconducting delay transmission line and used as an input end of a two-stage amplifying circuit, an output end of the amplifying circuit is connected with a base of a triode, and an emitter of the triode is connected with an integrating circuit.

a. In the center of a single image element, a parallel structure formed by a superconducting SNSPD and a thin film resistor is used, as shown in FIG. 3. The ends of the superconducting SNSPD and the thin film resistor are connected to a coplanar superconducting delay transmission line, which is connected to the input of a two-stage amplifier circuit, and the output of the amplifier circuit is connected to the base of a MOSFET, and the emitter of the MOSFET is connected to an integration circuit.

Figure 4:
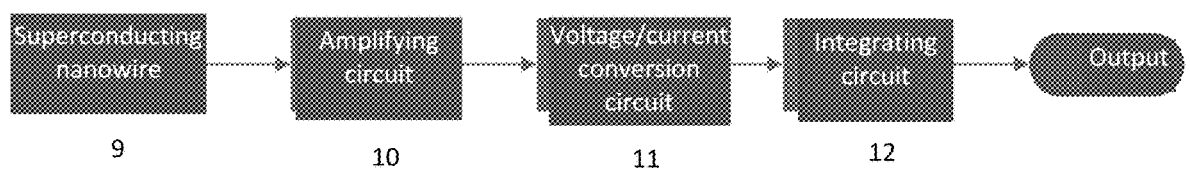
FIG. 4 is an integration imaging process.

The working principle of the integration imaging circuit is shown in FIG. 4. The circuit is biased in a state slightly lower than the superconducting critical current of the SNSPD when the picture elements are at a superconducting low temperature; the superconducting state of an absorption area is damaged after the SNSPD absorbs photons, a "hot-spot" appears, and resistance is generated, and at this time, the superconducting SNSPD and the resistor are considered to be connected in parallel, so that the resistance value of the whole circuit is changed; with the cooling of the SNSPD and the substrate, the "hot-spot" disappears and the SNSPD is recovered to an initial state; the process is represented as electrical pulse signals on an external circuit, the electrical pulse signals are amplified by a two-stage amplifying circuit with a superconducting delay line, and voltage signals are converted into current signals by an MOS transistor; and the current signals are integrated to obtain the charge on the picture element, and the number of photons of the picture element is calculated and obtained according to the charge quantity of a single pulse.

The operating principle of the integrated imaging circuit is shown in FIG. 4. When the SNSPD is at a superconducting low temperature, a bias current $I_{bias}$ ($I_{bias}\sim 0.9I_c$) slightly below the superconducting critical current ($I_c$) of the superconducting SNSPD is applied to the biastee circuit; after the SNSPD absorbs the photon, the absorbed incident photon energy is much larger than the superconducting energy gap of the material, which destroys a large number of Cooper pairs and triggers a number of unevenly distributed quasi-particles (quasiparticle), which are quasiparticles with a higher temperature than the Cooper pair, forming a hot spot in the superconducting film and generating resistance, and this resistive region prevents the transmission of bias current. The resistive region continues to grow with the assistance of the Joule thermal effect and causes a decrease in the nanowire current; the decrease in the current on the SNSPD simultaneously attenuates the Joule thermal effect in the resistive region, while the high temperature region dissipates heat through the SNSPD and substrate As the SNSPD and substrate dissipate heat to the surrounding area, the "hot spot" region disappears and the SNSPD returns to its initial state; this detection process is manifested on the external circuit as an electrical pulse signal. The electrical pulse signal is amplified by a two-stage amplifier circuit with superconducting delay lines, and the voltage signal is converted to a current signal by a MOS transistor; the current signal is integrated to obtain the charge on a single image element, and the number of incident photons at the pixel is calculated and obtained based on the charge of a single pulse.

The resistor in the picture element circuit is made of metal materials or other resistance materials and the resistance value is $10\Omega$ to $10000\Omega$. After superconducting nanowire photon responses, the nanowire resistor is changed from a superconducting state to a resistance state, the resistance is in the order of $k\Omega$ to $M\Omega$; at this time, the SNSPD is in short circuit connection with the resistance, the resistance plays a good shunting role, a temporary resistance state formed by superconducting disturbance inside the SNSPD is released, the SNSPD is prevented from being in a latch state, the superconducting current of the SNSPD is improved, the current reduce time of the SNSPD is shortened, and the SNSPD is enabled to be rapidly recovered to the superconducting state.

Figure 5:
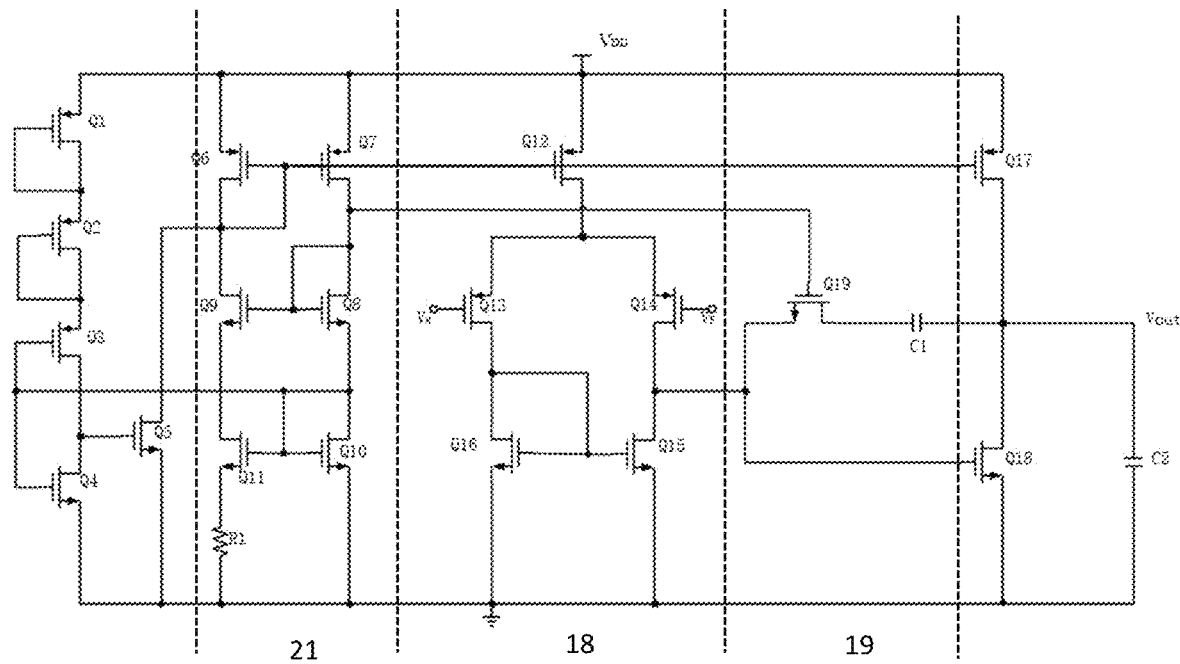
FIG. 5 is a two-stage amplifying circuit.

As shown in FIG. 5, the two-stage amplifying circuit mainly comprises four parts: a biasing circuit, a first stage amplifying circuit, a second stage amplifying circuit and a compensating circuit; wherein the first-stage amplifying circuit adopts differential input, so that common-mode signal interference is effectively suppressed; the second-stage amplifying circuit adopts a common-source amplifier, a constant bias current is provided by an MOS transistor, the MOS transistor $Q_{19}$ works in a linear region and is equivalent to a resistor, and $Q_{19}$ and $C_1$ form a Miller compensation circuit; a resistor R is added to the source of an MOS transistor in the bias circuit, and a stable current source $I_B$ is generated in a branch circuit.

A voltage/current conversion circuit is realized by a field effect transistor, an SNSPD array in the circuit works at extremely low temperature, a common semiconductor amplifier cannot work normally, and the field effect transistor is a voltage control device and controls a drain to output current $I_D$ through gate voltage $V_{GS}$; voltage outputted by a front end circuit is connected to a non-inverting input end of a comparator, reference voltage is connected to an inverting input end of a comparator, an output end of the comparator is connected to the G pin through a pull-up resistor, and if the voltage outputted by the front end circuit is controlled to be higher than the reference voltage, the MOS transistor conducts the output current.

Figure 6:
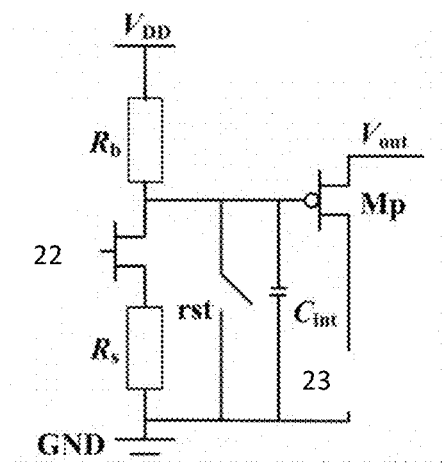
FIG. 6 is an integrating circuit.

As shown in FIG. 6, the integrating circuit is composed of a PMOS transistor and an integrating capacitor, and the current outputted by the front-end circuit is charged to the integrating capacitor through an injection transistor to realize integration; the gain of the circuit is mainly related to the size of the capacitor and is also limited by the voltage of the power supply, the circuit is reset to a low potential before integration, and the circuit adopts a switch to reset forcibly and can also reset by adopting an MOS transistor.

The signals outputted by each picture element are collected to a buffer, a number of photons of picture element (i.e., pixel point) is calculated by a coefficient of which charge quantity is in direct proportion to the number of photons, and for a large array detector, the larger the array is, the more the picture elements are, the higher the pixels are, and the higher the image restoration is.

Figure 7:
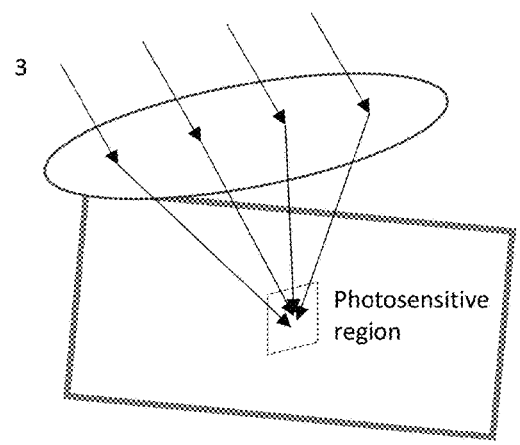
FIG. 7 is a lens condensing process.
Figure 8:
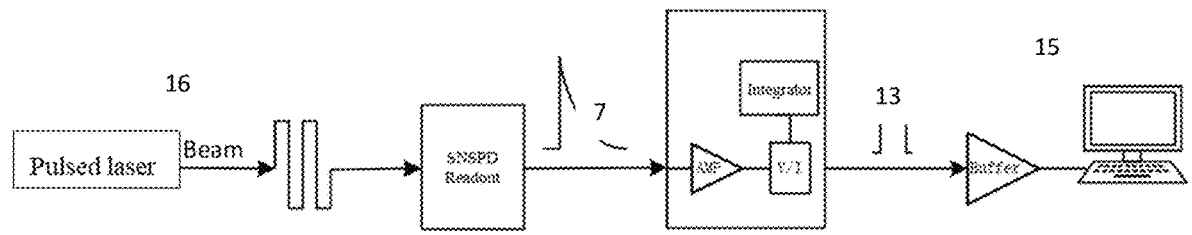
FIG. 8 is a picture element processing process.
Figure 9:
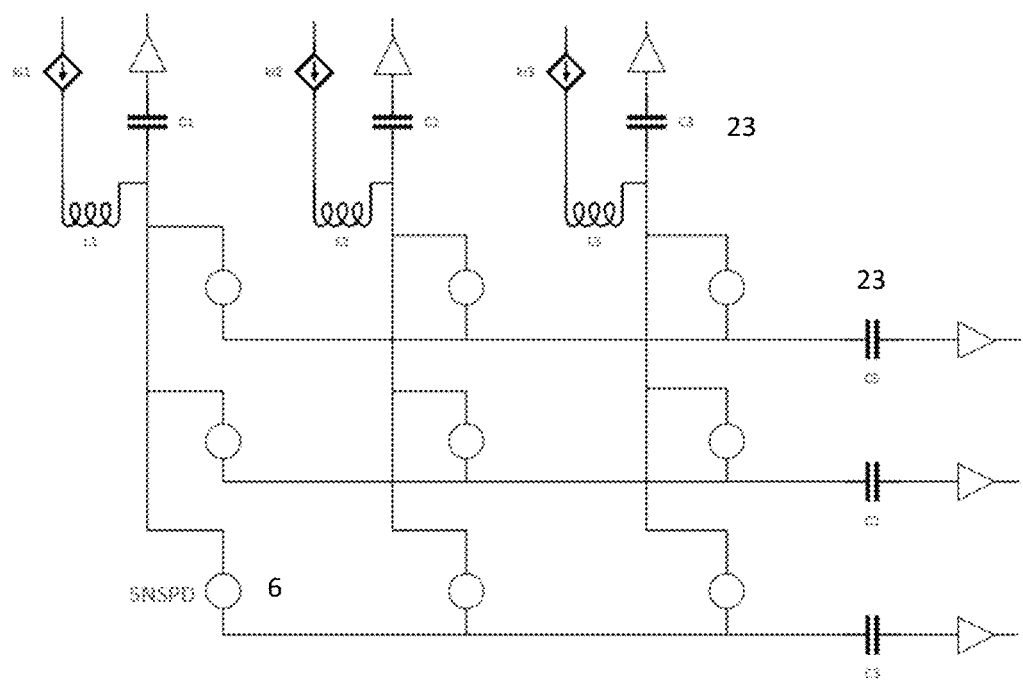
FIG. 9 is an array circuit principle.

By adopting a special photon alignment system, as shown in FIG. 7, a lens array splits incident lights into a plurality of beams with the same number as that of picture elements, and the plurality of beams are converged to a superconducting nanowire detection area, so that the filling rate of the array device is improved.

a. By using a special photon alignment system, as shown in FIG. 7, the lens array increases the fill rate of the array device by dividing the incident light into multiple rays by the same number of beam splitters as the number of picture elements, and the multiple rays converge to the superconducting nanowire detection area.

b. The picture element structure is shown in FIG. 8, the picture pixel is shown in FIG. 9 and is formed by arranging a plurality of picture elements, and each picture element in the array is provided with a single SNSPD, a signal processing circuit and an integrating circuit; each column is connected with a constant current source to provide a bias current for the superconducting SNSPDs; the output end of each row of picture elements is connected with a buffer for a computer to read data, and the picture elements in each row are connected with each other by superconducting delay lines.

A photon detection is performed on a surface of an object, and different photon pulse signals reflected by the surface of the object are emitted into a picture element detection area of an integral imaging device through the lens array.

Assuming that all picture elements in the array simultaneously respond to photons and generate electrical pulse signals, electrical pulse signals of each picture element are integrated in a period using a time sequence circuit, output voltages are transmitted into a buffer, and the signals are read into a computer by rows; the longer the integration period is, the more photons the detector array detects each period, but the much longer the integration period is, the much more photons are, which results in the integrated signal being too large to be processed, so an integration period should be chosen appropriately.

After a photon is absorbed by a superconducting nanowire, assuming that the position of a picture element generating response on the SNSPD is $x_a$, the time point of photon absorption is $t_a$, an electrical pulse signal is generated at the position of the picture element, the electrical pulse signal is processed by a peripheral circuit of the picture element, a voltage $V_0$ is outputted to a register $R_a$, the electrical pulse signal is transmitted to the other end of the SNSPD at a fixed speed v, the time read by a computer is $\tau$ and $\tau'$ after subtracting fixed delays such as access transmission time and reading delay time of electrical pulse in the peripheral circuit and the register; and assuming that each row of detector delay lines have an equivalent length of L, based on a relationship between distance, time and speed, it can be concluded that $\tau=t_a+(L-x_a)/v$ and $\tau'=t_a+x_a/v$, and the relationship between the position $x_a$ of the picture element and the time $t_a$ is $x_a=((\tau-\tau')v+L)/2$ and $t_a=((\tau+\tau')-L/v)/2$ after photon absorption.

When n pixels in the same row generate photon response at the same time, the position of the photon response is determined according to the time $\tau_1, \tau_2, \ldots, \tau_n$ of reading picture elements; after a fixed time T, according to direct proportion of charge quantity to a number of photons, the voltage signal received by each picture element (pixel point) is restored to the number of photons to generate a statistical graph with gray scale, and when the superposition times are enough, the gray scale graph can reflect specific photon information of the identified object.

a. When n image elements in the same row produce photon response at the same time, the position of photon response is determined according to the time $\tau 1$, $\tau 2, \ldots, \Sigma n$ of reading image elements; after a fixed time T, according to the direct ratio of charge to photon number After a fixed time T, the voltage signal received by each image element is reduced to the photon number according to the direct ratio of charge to photon number, and a grayscale statistical map of photon intensity is generated, which can reflect the specific photon information of the identified object when the number of superposition is sufficient.

The pulsed laser is used to record total round-trip time of each photon $\tau_{all}$, a distance between the actual position of the object and the pixel points is calculated according to $1=c*\tau_{all}/2$, where c is light speed in free space, and a three-dimensional image of an object can be reconstructed after obtaining spatial position information of the object.

The pulsed laser is used to emit pulsed light onto the surface of the object to be measured, and the incident light is reflected on the surface of the object, and the reflected return light signal is detected with a superconducting nanowire single photon detector, and this time difference is called the photon round trip time. The total round-trip time $\tau_{all}$ of each photon is recorded, and the distance between the actual position of the object and the pixel point is calculated according to $1=c*T_{all}/2$, where c is the speed of light in free space, and the 3D image of the object can be reconstructed after obtaining the spatial position information of the object.

The above embodiments are not limiting of the present invention, and any modifications, equivalents and improvements made within the spirit and principle of the present invention are included in the protection scope of the present invention.

What is claimed is:

1. A three-dimensional imaging method based on a superconducting nanowire photon detection array comprising: forming a superconducting nanowire photon detection array using a superconducting nanowire single photon detector (SNSPD) as a pixel; using a lens array to divide laser incident light multiple beams equal to numbers of pixels, which converge to photosensitive surface area of the SNSPD; using a pulsed laser emits pulsed light to surface of an object to be measured, the pulsed light is reflected on the surface of the object, a reflected back light signal passes through lens, the SNSPD detects a return signal, and records time difference of each emitted photon and received light signal as an emitted photon round trip time; the number of photons detected by each single-image detector is collected; a grayscale value of the pixel is calculated based on the number of photons, and plotted as a grayscale image, the distance between the object and the SNSPD is calculated based on the emitted photon round-trip time of each photon, and a 3D image of the object is reconstructed based on the grayscale image and the distance between the object and the pixel.

2. The three-dimensional imaging method based on the superconducting nanowire photon detection array according to claim 1, wherein the pixel adopts a superconducting nanowire circuit, an amplifying circuit, a converting circuit, an integrating circuit and a buffer; and the superconducting nanowire circuit is connected with an input end of the amplifying circuit, an output end of the amplifying circuit is connected to the integrating circuit through the converting circuit, and an output end of the integrating circuit is connected with a computer through the buffer.

3. The three-dimensional imaging method based on the superconducting nanowire photon detection array according to claim 2, wherein further comprising a step of collecting the number of photons detected by each pixel comprises: placing the pixels at a superconducting low temperature, and biasing the superconducting nanowire circuit to be in a state slightly lower than a superconducting critical current of the SNSPD; allowing the SNSPD to absorb photons and inflicting a damage on a superconducting state of an absorption area, then resulting in a "hot-spot", and leading to changes in a resistance value; cooling the SNSPD, resulting in disappearance of "hot-spot", allowing the SNSPD to restore to an initial state, and leading to changes in the resistance value; enabling a circuit to generate electrical pulse signals by the changes of the resistance value of the SNSPD, and amplifying the electrical pulse signals by the amplifying circuit; converting voltage signals into current signals by the converting circuit, and obtaining the amount of charge in current signals as charge on absorbed photons by the integrating circuit; and storing the charge on the absorbed photons in the buffer and inputting the charge on the absorbed photons into the computer by rows, and comparing the charge on the absorbed photons with charge on single photon to obtain the number of the absorbed photons.

4. The three-dimensional imaging method based on the superconducting nanowire photon detection array according to claim 2, wherein the superconducting nanowire circuit is located at a center of the pixel, and is connected with coplanar superconducting delay lines by connecting the SNSPD and a thin film resistor in parallel; each row of the superconducting delay lines are connected with each other, the thin film resistor has a resistance value between 10Ω and 10000Ω, and the resistance generated by superconducting nanowire photon responses is in an order from kΩ to MΩ; the thin film resistor short-circuits the resistance generated by the SNSPD, and releases a temporary resistance generated by internal superconducting disturbance, and the SNSPD is quickly restored to a superconducting state.

5. The three-dimensional imaging method based on the superconducting nanowire photon detection array according to claim 2, wherein the amplifying circuit adopts a first stage amplifying circuit, a second stage amplifying circuit, a compensating circuit and a biasing circuit; the first-stage amplification circuit adopts differential input, and the second-stage amplification circuit adopts a common-source amplifier; the compensating circuit consists of an MOS (Metal-Oxide-Semiconductor) transistor and a capacitor, wherein the MOS transistor works in a linear region and provides a constant bias current; and resistance is added into the biasing circuit by a source of the MOS transistor, and each pixel shares a constant current source to generate a stable current.

6. The three-dimensional imaging method based on the superconducting nanowire photon detection array according to claim 2, wherein the converting circuit adopts a comparator and an MOS transistor, an input voltage is connected to a non-inverting input end of the comparator, a reference voltage is connected to an inverting input end of the comparator, an output end of the comparator is connected to a gate of the MOS transistor through a pull-up resistor, a drain of the MOS transistor is used as an output current, and if the input voltage is higher than the reference voltage, the MOS transistor conducts the output current.

7. The three-dimensional imaging method based on the superconducting nanowire photon detection array according to claim 2, wherein the integrating circuit adopts an MOS transistor and a capacitor, and an input current charges the capacitor through the MOS transistor to realize integration; and the circuit is reset to a low potential before integrating, and forced reset by a switch or reset by an MOS transistor is adopted.

8. The three-dimensional imaging method based on the superconducting nanowire photon detection array according to claim 2, wherein further comprising a step of a gray-scale image by the pixels comprises: setting a position in the SNSPD for generating photon responses as $x_a$, a time point for absorbing photons as $t_a$, a transmission speed of electrical pulse signals generated by the picture element along the SNSPD as v, connecting a superconducting delay line with a detector of each pixel, and reading time by a computer as $\tau$ and $\tau'$ after the superconducting delay line through a peripheral circuit and a register, wherein each row of the superconducting delay lines have an equivalent length of L, thus $\tau=t_a+(L-x_a)/v$ and $\tau'=t_a+x_a/v$, and after photons are absorbed, $x_a=((\tau-\tau')v+L)/2$ and $t_a=((\tau\pm\tau')-L/v)/2$; and setting n pixels in each row simultaneously generating the photon responses, wherein the reading time is $\tau_1, \tau_2, \ldots, \tau_n$, and calculating to obtain positions of the photon responses.

9. The three-dimensional imaging method based on the superconducting nanowire photon detection array according to claim 2, wherein further comprising a step of calculating the distance between the object and the pixels according to the round-trip time of each photon comprises: setting the round-trip time of the photon as $\tau_{all}$ and light speed as c, wherein the distance between the object and the pixels is calculated according to $l=c*\tau_{all}/2$.

\* \* \* \* \*